United States Patent [19]
Hatano et al.

[11] Patent Number: 5,805,250
[45] Date of Patent: Sep. 8, 1998

[54] LIQUID CRYSTAL DISPLAY DEVICE WITH CONTACT HOLES EXTENDING THROUGH INTERLAYER INSULATING FILM BETWEEN SWITCHING ELEMENTS AND PIXEL ELECTRODES

[75] Inventors: Akitsugu Hatano, Nara; Takashi Shibatani, Tenri; Yukihiro Sumida, Nara; Takayuki Shimada, Yamatokoriyama; Yasunobu Tagusa, Ikoma, all of Japan

[73] Assignee: Sharp Kabushiki Kaisha, Osaka, Japan

[21] Appl. No.: 739,755

[22] Filed: Oct. 29, 1996

[30] Foreign Application Priority Data

Oct. 31, 1995 [JP] Japan .................................. 7-284159

[51] Int. Cl.⁶ ...................... G02F 1/1335; G02F 1/1333; G02B 27/22; G02B 27/26
[52] U.S. Cl. ............................... 349/96; 349/15; 349/106; 349/138; 359/464; 359/465
[58] Field of Search .............................. 349/96, 106, 117, 349/15, 138; 359/464, 465

[56] References Cited

U.S. PATENT DOCUMENTS

| | | | |
|---|---|---|---|
| 4,241,984 | 12/1980 | Leibowitz | 350/337 |
| 4,593,977 | 6/1986 | Takamatsu et al. | 350/339 |
| 4,688,896 | 8/1987 | Castleberry | 350/333 |
| 4,743,099 | 5/1988 | Dickerson et al. | 350/339 |
| 5,006,913 | 4/1991 | Sugahara et al. | 357/41 |
| 5,032,883 | 7/1991 | Wakai et al. | 357/23.7 |
| 5,166,085 | 11/1992 | Wakai et al. | 438/158 |
| 5,221,978 | 6/1993 | Heynderickx et al. | 359/53 |
| 5,235,449 | 8/1993 | Imazeki et al. | 349/96 |
| 5,250,214 | 10/1993 | Kanemoto et al. | 252/299.01 |
| 5,335,102 | 8/1994 | Kanemori et al. | 359/59 |
| 5,365,357 | 11/1994 | Ohgawara et al. | 349/117 |
| 5,402,191 | 3/1995 | Dean et al. | 352/63 |
| 5,541,745 | 7/1996 | Fergason | 349/98 |
| 5,585,951 | 12/1996 | Noda et al. | 359/74 |
| 5,640,273 | 6/1997 | Hamagishi et al. | 349/145 |
| 5,641,974 | 6/1997 | den Boer et al. | 257/59 |
| 5,682,211 | 10/1997 | Yao et al. | 349/38 |

FOREIGN PATENT DOCUMENTS

| | | |
|---|---|---|
| 58-184929 | 10/1983 | Japan . |
| 62-135810 | 6/1987 | Japan . |
| 135351 | 7/1989 | Japan . |
| 4307521 | 10/1992 | Japan . |
| 474714 | 11/1992 | Japan . |
| 6230422 | 8/1994 | Japan . |
| 7-122719 | 12/1995 | Japan . |

OTHER PUBLICATIONS

Fujita et al: "Colorless Polyimide," vol. 29, No. 1 (Jun. 1991), pp. 20–28.

Sakamoto et al: "27.3: A High–Aperture–Ratio 3–in.–Diagonal VGA a–Si Light Valve with Pixel/Data and Pixel/Gate Lines Overlapping," *SID 96 DIGEST*, pp. 681–684, 1996.

Kim et al: "4:3: High–Aperture and Fault–Tolerant Pixel Structure for TFT/LCDs," *SID 95 Digest*, pp. 15–18, 1995.

*Primary Examiner*—Anita Pellman Gross
*Assistant Examiner*—Tarifur R. Chowdhury
*Attorney, Agent, or Firm*—Nixon & Vanderhye P.C.

[57] ABSTRACT

The transmission type liquid crystal display device of this invention includes a pair of substrates and a liquid crystal layer interposed therebetween. One of the substrates includes: scanning lines and signal lines crossing each other; switching elements formed at crossings of the scanning lines and the signal lines; an insulating film of a light-transmitting organic material which cover the scanning lines and the signal lines and the switching elements; and pixel electrodes formed on the insulating film. The insulating layer has at least a polarizing property. The other substrate also includes a layer having at least the polarizing property. At least one of the layers having the polarizing property formed on the substrates is arranged inside of the liquid crystal display device.

10 Claims, 11 Drawing Sheets

LIQUID CRYSTAL DISPLAY DEVICE WITH CONTACT HOLES EXTENDING THROUGH INTERLAYER INSULATING FILM BETWEEN SWITCHING ELEMENTS AND PIXEL ELECTRODES

RELATED APPLICATION

This application is related to copending application 08/695,632, filed Aug. 12, 1996.

BACKGROUND OF THE INVENTION

1. Field of the Invention

The present invention relates to a transmission type liquid crystal display device capable of displaying three-dimensional images as well as two-dimensional images, used for TV sets, game machines, personal computers, CAD (computer aided design) machines, medical monitoring apparatuses, and the like.

2. Description of the Related Art

Conventionally, liquid crystal displays (LCDs), cathode ray tubes (CRTs), plasma displays, and the like are used for displaying two-dimensional flat images such as pictures, characters, graphics and the like. In recent years, transmission type liquid crystal display devices adopting an active matrix driving method have especially attracted attention because they are thin and light-weight and have high display quality. Such transmission type liquid crystal display devices are used for portable personal computers, portable TV sets, car navigation systems, and the like.

FIG. 12 is a circuit diagram of one of such conventional transmission type active matrix liquid crystal display devices.

Referring to FIG. 12, an active matrix substrate provided with switching elements includes a plurality of pixel electrodes 1 formed in a matrix. TFTs 2 as the switching elements are connected to the corresponding pixel electrodes 1. Gate electrodes of the respective TFTs 2 are connected to corresponding gate lines 3 as scanning lines, so that the driving of the TFTs 2 are controlled with gate signals input into the gate electrodes. Source electrodes of the respective TFTs 2 are connected to source lines 4 as signal lines, so that data (display) signals are input into the pixel electrodes 1 via the TFTs 2 when the TFTs 2 are activated. The gate lines 3 and the source lines 4 run along the peripheries of the pixel electrodes 1 and cross each other. A drain electrode of each TFT 2 is connected to the corresponding pixel electrode 1 and one electrode of a storage capacitance 5. The other electrode of the storage capacitance 5 is connected to a common line 6.

FIG. 13 is a sectional view showing one TFT of the active matrix substrate of the conventional liquid crystal display device.

Referring to FIG. 13, each gate electrode 12 which is connected to the gate line 3 shown in FIG. 12 is formed on a transparent insulating substrate 11. A gate insulating film 13 is formed covering the gate electrode 12. A semiconductor layer 14 is formed so that it overlaps the gate electrode 12 via the gate insulating film 13. A channel protection layer 15 is formed on the center portion of the semiconductor layer 14. A pair of n$^+$Si layers which are to be a source electrode 16a and a drain electrode 16b are formed covering both ends of the channel protection layer 15 and portions of the semiconductor layer 14 in such a manner that they are separated at the top of the channel protection layer 15. A metal layer 17a which is to be the signal line 4 shown in FIG. 12 is formed to overlap one of the n$^+$Si layers as the source electrode 16a, while a metal layer 17b which connects the drain electrode 16b and the pixel electrode 1 is formed to overlap the other n$^+$Si layer as the drain electrode 16b. An interlayer insulating film 18 is formed covering the resultant TFT 2, the gate line 3 and the source line 4.

A transparent conductive film which is to be the pixel electrode 1 is formed on the interlayer insulating film 18, and via a contact hole 19 which is formed through the interlayer insulating film 18, is connected to the metal layer 17b which is in turn connected to the drain electrode 16b of the TFT 2.

With the existence of the interlayer insulating film 18 between the gate and source lines 3 and 4 and the transparent conductive film as the pixel electrode 1, it is possible to overlap the pixel electrode 1 on the lines 3 and 4. This overlap structure is disclosed, for example, in Japanese Laid-Open Patent Publication No. 58-172685. This makes it possible to improve the aperture ratio of the resultant liquid crystal display device, as well as to shield an electric field generated in the lines 3 and 4, thereby suppressing an occurrence of disclination.

The interlayer insulating film 18 is conventionally formed by depositing an inorganic material such as silicon nitride (SiN) by CVD to a thickness of about 5000 Å.

A three-dimensional image display is conventionally realized using such a liquid crystal display device for a two-dimensional image display. For example, at least one polarizing plate is attached to an outer surface of a liquid crystal panel, and images displayed on the liquid crystal panel are observed through a pair of polarizing glasses worn by the observer. FIG. 14 is a conceptual view of a conventional three-dimensional image display using a pair of polarizing glasses.

In the three-dimensional image display shown in FIG. 14, each row of pixels is assigned to either one of an image for right-eye and an image for left-eye so that the right-eye image and the left-eye image are alternately displayed. In addition, polarizing plates 22 are provided on surfaces of a liquid crystal display panel 21. The polarizing plate 22 includes polarizing elements 22a and 22b of which polarizing axes are perpendicular to each other, and is disposed on each surface of a liquid crystal display panel 21 so that the polarizing elements 22a and 22b are placed adjacent to the right-eye and left-eye pixels, respectively.

The observer wears a pair of polarizing glasses 24 including polarizing plates 24a and 24b for the right and left eyes of which polarizing axes correspond to those of the right-eye and left-eye pixels, respectively. Thus, the right and left eyes can observe only images corresponding to the right-eye and left-eye pixels, resulting in perceiving three-dimensional images.

The above configuration is disclosed, for example, in Japanese Laid-Open Patent Publication No. 58-184929, where three-dimensional image display is realized with a conventional liquid crystal display device for two-dimensional image display.

However, the above conventional configuration has problems as follows. When the polarizing plates 22 are placed on the outer surfaces of the liquid crystal display panel 21, as shown in FIG. 15, a glass substrate 26 is interposed between the right-eye and left-eye pixels 25a and 25b and the right-eye and left-eye polarizing elements 22a and 22b of one polarizing plate 22. In this case, when a liquid crystal display device 23 is observed obliquely through the pair of polarizing glasses 24, an image of the right-eye pixel 25a may be observed through the left-eye polarizing element 22b, while an image of the left-eye pixel 25b may be observed through the right-eye polarizing element 22a. As a result, an image for the right eye is received by the left eye of the observer, while an image for the left eye is received by the right eye, causing crosstalk and thus presenting a pseudostereoscopic image. Thus, in the configuration where the polarizing plates 22 are disposed on the outer surfaces of the liquid crystal display panel 21, the range where the observer can perceive a stereoscopic image (a three-dimensional image) is limited. In other words, three-dimensional images with a narrow angle of visibility are produced.

For example, when the glass substrate of the liquid crystal display panel 21 has a refractive index of 1.52 and a thickness of 1.1 mm and the pitch of the pixels in the vertical direction is 330 µm (substantially corresponding to a 10.4 inch VGA panel), a crosstalk of doubling right and left images in both eyes occurs when observed at a position apart from the display screen by 50 cm and inclined upward or downward from the front by about 12 cm. A pseudostereoscopic image is observed when the position is further inclined upward or downward by another 12 cm.

In order to overcome the above problem, Japanese Laid-Open Patent Publication No. 62-135810 proposes to dispose the polarizing plate on the inner surface of the glass substrate of the liquid crystal display panel. In this case, since the right-eye and left-eye pixels are located adjacent to the right-eye and left-eye polarizing elements, the above crosstalk does not occur even when the observation position moves upward or downward. Accordingly, the range where a three-dimensional image can be perceived is not limited, and thus a liquid crystal display device capable of providing three-dimensional display with a wide angle of visibility can be obtained.

In practice, however, the following problem occurs. The polarizing plates or layers actually used at present are low in heat resistance. Under a high temperature of 180° C. or more, iodine and the like are released from the polarizing plates or layers, losing the polarizing capability.

When a polarizing layer is intended to be formed inside the liquid crystal display panel of the active matrix driving method, the polarizing layer may be disposed either in the active matrix substrate or in a counter substrate having a color filter. When being formed in the active matrix substrate, the polarizing layer should be inevitably interposed somewhere between the glass substrate and the pixel electrodes because, if it is interposed between the pixel electrodes and a liquid crystal layer, the liquid crystal layer cannot be driven satisfactorily due to a voltage loss caused by the polarizing layer. When the polarizing layer is formed between the glass substrate and the pixel electrodes, however, the polarizing layer is exposed to a high temperature of 180° C. or more in the process of forming the switching elements. Therefore, in practice, it is difficult to form the polarizing layer on the inner surface of the active matrix substrate.

The only way left is to dispose the polarizing layer in the counter substrate. In this case, the counter substrate must be used as the display screen facing the observer in order to prevent an occurrence of crosstalk. In such a liquid crystal display device using the counter substrate as the display screen, only the active matrix substrate can be used as the light incident side. The range of available fields for such a liquid crystal display device is greatly limited.

More specifically, when a liquid crystal display device is used for a projector and the like, the counter substrate is normally located on the side of a light source to prevent the characteristics of the switching elements of the active matrix substrate from varying due to strong light from the light source. As a result, the conventional liquid crystal display device of the active matrix driving method cannot be used for projectors and the like. Crosstalk arises if the polarizing layer is formed on the outer surface of the active matrix substrate located on the side of the observer, while the polarizing capability of the polarizing layer is lost by heat treatment if the polarizing layer is formed inside the active matrix substrate.

Another problem of the liquid crystal display device of the active matrix driving method is as follows. When $SiN_x$, $SiO_2$, $TaO_x$, or the like is deposited on the interlayer insulating film 18 by CVD or sputtering to form a transparent insulating film, the resultant film reflects the unevenness in the thickness of the underlying layer. Accordingly, when the pixel electrodes 1 are formed on the transparent insulating film, steps corresponding to steps of the underlying layer are formed on the surface of the pixel electrodes 1. Such steps cause failure in the alignment of liquid crystal molecules in the liquid crystal layer interposed between the active matrix substrate and the counter substrate.

As described above, it is possible to overlap the pixel electrodes 1 on the gate lines 3 and the source lines 4 by forming the interlayer insulating film 18 therebetween. This improves the aperture ratio of the resultant liquid crystal display device. When each pixel electrode 1 overlaps the lines 3 and 4, however, capacitances between the pixel electrode 1 and the lines 3 and 4 increase. In particular, when the interlayer insulating film 18 is formed by depositing an inorganic material such as silicon nitride which has a dielectric constant as high as 8 by CVD, the thickness of the resultant film is as small as 5000 Å. It takes too much time to further thicken the inorganic film such as a silicon nitride film in consideration of the fabrication process. Such a thin film increases the capacitances between the pixel electrode 1 and the lines 3 and 4, causing a problem described below.

When each pixel electrode 1 overlaps the corresponding source line 4, the capacitance between the pixel electrode 1 and the source line 4 increases, resulting in increasing the signal transmission rate. As a result, a data signal held in the pixel electrode 1 during the holding period is fluctuated depending on the potential of the data signal. This varies the effective voltage to be applied to the portion of the liquid crystal corresponding to the pixel and thus causes a vertical crosstalk especially in an adjacent pixel in the vertical direction in the displayed image.

SUMMARY OF THE INVENTION

According to one aspect of the invention, a transmission type liquid crystal display device including a plurality of pixels for displaying an image includes: a first substrate and a second substrate opposed to each other; a liquid crystal layer interposed between the first and the second substrates; a plurality of electrodes for driving the pixels in accordance with data signals, the electrodes including a plurality of pixel electrodes formed on the first substrate and at least one counter electrode formed on the second substrate; switching elements, connected to the plurality of pixel electrodes, for supplying the data signals, wherein the switching elements are disposed on the first substrate; scanning lines, formed on the first substrate, for transmitting signals which control the actuating of the switching elements; signal lines, formed on the first substrate to cross the scanning lines, for transmitting the data signals to the switching elements; an interlayer insulating film formed on the first substrate to cover the switching elements, the scanning lines and the signal lines, wherein the interlayer insulating film has at least a polarizing property; and a further layer having a polarizing property formed on the second substrate. At least one of the interlayer insulating film and the further layer is formed inside of the first substrate and the second substrate when the first substrate and the second substrate are attached to each other.

In one embodiment of the invention, the pixels include groups of right-eye pixels and groups of left-eye pixels. At least one of the interlayer insulating film and the further layer includes first portions allowing polarized light having a first polarization to pass therethrough and second portions allowing polarized light having a second polarization to pass therethrough. The first portions and the second portions are arranged to correspond to the groups of right-eye pixels and the groups of left-eye pixels, respectively.

In another embodiment of the invention, a retardation layer formed on the second substrate is further provided. The retardation layer, the further layer and the counter electrode are disposed on the side of the second substrate which is adjacent to the liquid crystal layer.

In still another embodiment of the invention, the interlayer insulating film has a function of a retardation film.

In still another embodiment of the invention, each of the interlayer insulating film and the further layer includes a double-layer structure composed of a lower layer and an upper layer.

In still another embodiment of the invention, each of the lower layer and the upper layer has polarizing portions having a polarizing property and non-polarizing portions without the polarizing property. The upper layer is disposed on the lower layer so that the polarizing portions of the upper layer are located on the non-polarizing portions of the lower layer and the non-polarizing portions of the upper layer are located on the polarizing portions of the lower layer.

In still another embodiment of the invention, the pixel electrodes overlap at least partially at least one of the scanning lines and the signal lines.

In still another embodiment of the invention, connection lines for connecting the pixel electrodes to the respective switching elements are provided. The connection lines are covered by the interlayer insulating film. The interlayer insulating film has contact holes through which the pixel electrodes are connected to the respective connection lines.

In still another embodiment of the invention, each of the groups of right-eye pixels and the groups of left-eye pixels includes a row of the pixels.

In still another embodiment of the invention, a color filter layer is further formed on the second substrate. The color filter layer includes a plurality of strips of three colors, and each of the strips corresponds to a column of the pixels.

Thus, according to the present invention, the interlayer insulating film, formed on the inner surface of the active matrix substrate, also serves as the polarizing layer. Accordingly, since the interlayer insulating film is formed after the heat treatment at the formation of the TFTs, the polarizing property of the interlayer insulating film will not be lost by heating which conventionally occurs when a polarizing layer is formed in the active matrix substrate before the formation of the TFTs. Crosstalk which conventionally occurs at three-dimensional image display can also be prevented. As a result, images with a wide angle of visibility can be obtained, and the display quality improves. Since the interlayer insulating film is provided with the polarizing property, the fabrication process can be shortened compared with the case of separately forming a polarizing layer.

Thus, the invention described herein makes possible the advantage of providing a transmission type liquid crystal display device where flat pixel electrodes overlap respective lines to improve the aperture ratio, failure in the alignment of liquid crystal molecules can be suppressed, the fabrication process can be simplified, an adverse effect, such as crosstalk of capacitances between the pixel electrodes and the lines on a display, can be reduced, thereby providing a good display. Crosstalk, which may occur with three-dimensional image display, can be prevented, thereby providing a good display with a wide angle of visibility, and the range of available fields for the liquid crystal display device can be widened.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings as follows.

EXAMPLE 1

In a transmission type liquid crystal display device of Example 1, light is incident on an active matrix substrate having a polarizing layer formed on the inner surface thereof, and two types of polarized light with different polarizations corresponding to right-eye and left-eye pixels are output from a counter substrate having a polarizing layer and a retardation layer formed on the inner surface thereof.

Figure 1:
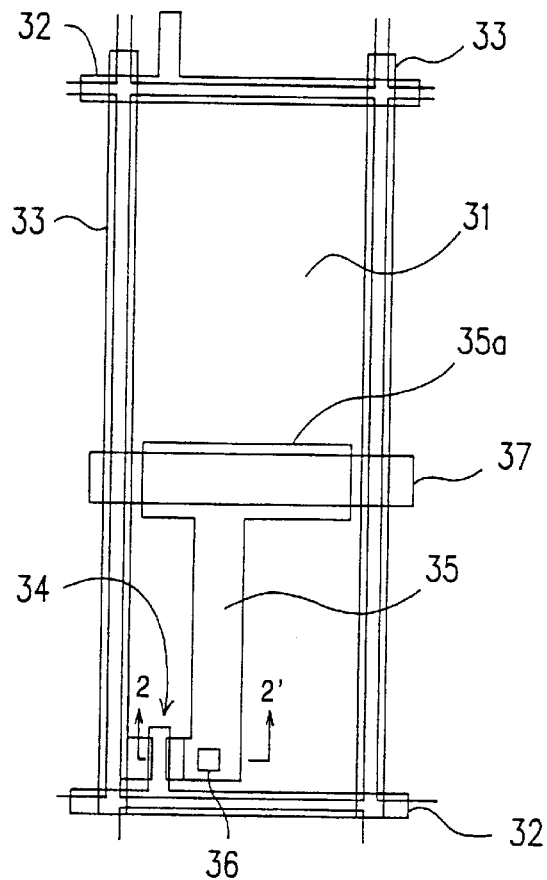
FIG. 1 is a plan view of one pixel of an active matrix substrate of a transmission type liquid crystal display device of Example 1 according to the present invention.

FIG. 1 is a plan view of one pixel of the active matrix substrate of the transparent liquid crystal display device of Example 1.

Referring to FIG. 1, the active matrix substrate includes a plurality of pixel electrodes 31 formed in a matrix. Gate lines 32 as scanning lines and source lines 33 as signal lines cross each other and run the peripheries of the pixel electrodes 31 so that the peripheries of the pixel electrodes 31 overlap the gate lines 32 and the source lines 33. TFTs 34 are formed in the vicinity of the crossings of the gate lines 32 and the source lines 33 as the switching elements connected to the pixel electrodes 31. Gate electrodes of the respective TFTs 34 are connected to the gate lines 32, so that the actuating of the TFTs 34 is controlled with gate signals input into the gate electrodes. Source electrodes of the respective TFTs 34 are connected to the source lines 33 so that data signals are input into the source electrodes of the TFTs 34. A drain electrode of each TFT 34 is connected to the corresponding pixel electrode 31 via a connection line 35 and a contact hole 36, as well as to one electrode 35a of a storage capacitance via the connection line 35. The other electrode 37 of the storage capacitance is connected to a common line.

Figure 2:
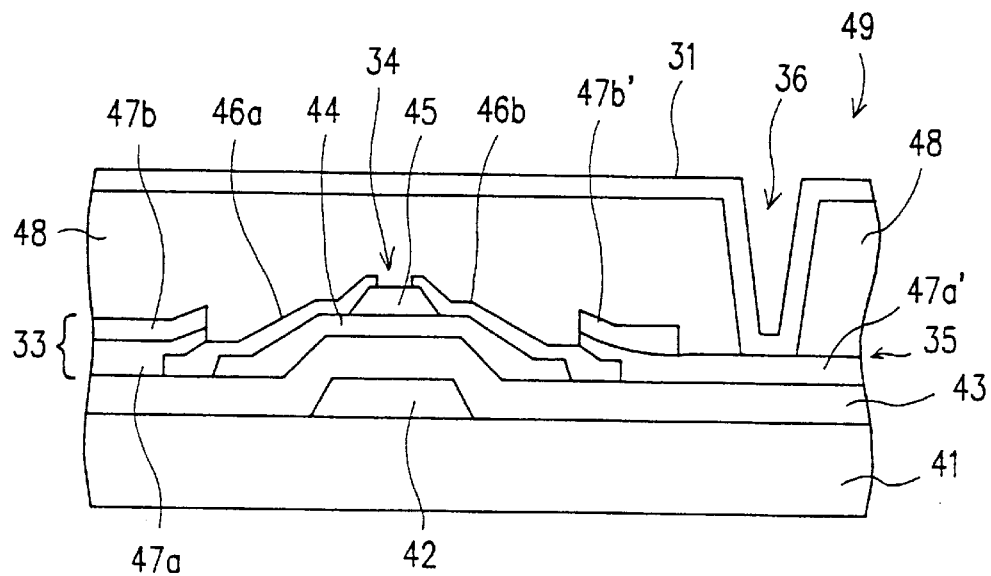
FIG. 2 is a sectional view taken along line A—A' of FIG. 1.

FIG. 2 is a sectional view of the above active matrix substrate which is denoted by the reference numeral 49, taken along line A—A' of FIG. 1.

Referring to FIG. 2, the gate electrode 42 of each TFT 34, which is connected to the corresponding gate line 32 shown in FIG. 1, is formed on a transparent insulating substrate 41. A gate insulating film 43 is formed covering the gate electrode 42. A semiconductor layer 44 is formed so that it overlaps the gate electrode 42 via the gate insulating film 43. A channel protection layer 45 is formed on the center portion of the semiconductor layer 44. A pair of n+Si layers, which are to be a source electrode 46a and a drain electrode 46b, are formed covering both ends of the channel protection layer 45 and portions of the semiconductor layer 44 in such a manner that they are separated at the top of the channel protection layer 45.

A transparent conductive film 47a and a metal layer 47b, which constitute the double-layer source line 33, is formed to overlap one of the n+Si layers as the source electrode 46a, while a transparent conductive film 47a' and a metal layer 47b' are formed to overlap the other n+Si layer as the drain electrode 46b. The transparent conductive film 47a' extends forming the connection line 35 which connects the drain electrode 46b' and the pixel electrode 31 and is connected to the electrode 35a of the storage capacitance.

An interlayer insulating film 48 is formed over the resultant TFT 34, the gate line 32, the source line 33, and the connection line 35. The interlayer insulating film 48 is a light-transmitting organic thin film and serves as a polarizing layer having a function of polarizing incident light. A transparent conductive film, which is to be the pixel electrode 31, is formed on the interlayer insulating film 48, and through a contact hole 36 formed through the interlayer insulating film 48, is connected to the drain electrode 46b of the TFT 34 via the connection line 35. An alignment film (not shown) is formed on the pixel electrode 31 as required. Thus, the active matrix substrate 49 of the transmission type liquid crystal display device of Example 1 is obtained.

Figure 3:
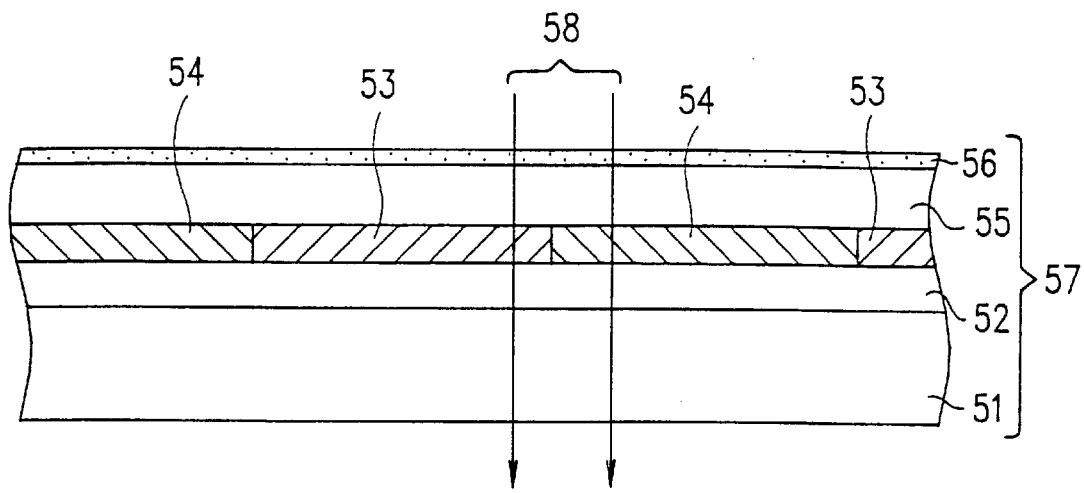
FIG. 3 is a sectional view of a counter substrate of the transmission type liquid crystal display device of Example 1.
Figure 4:
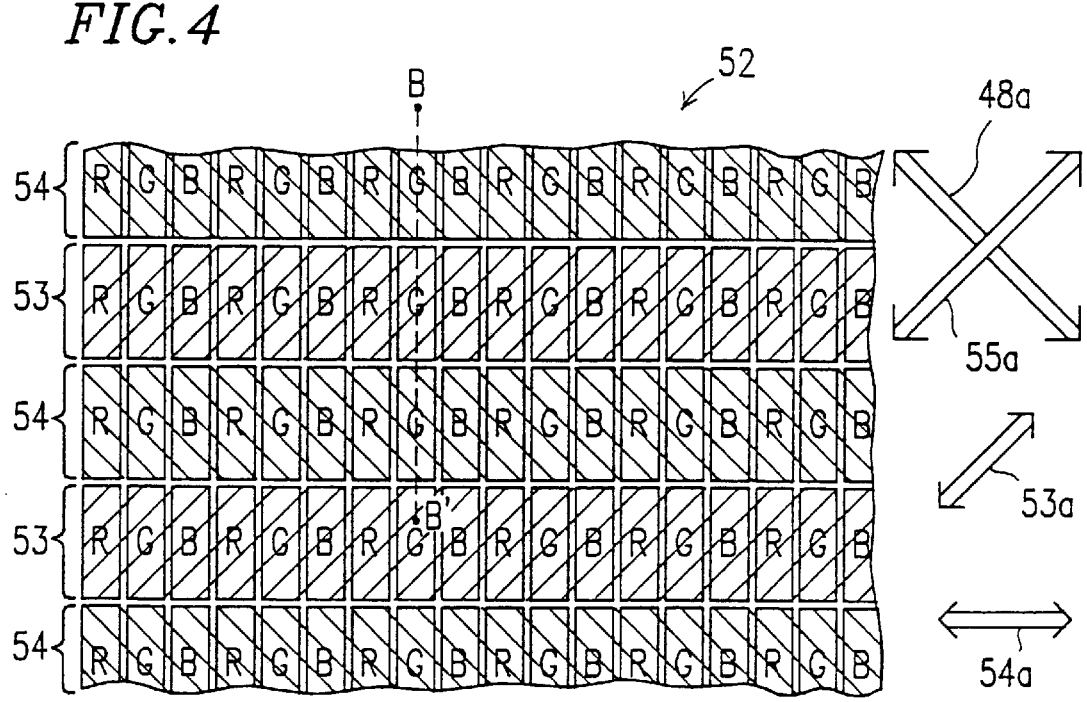
FIG. 4 is a plan view of the pixel structure as is viewed from the side of the counter substrate of the transmission type liquid crystal display device of Example 1.

The configuration of the counter substrate of the transmission type liquid crystal display device of Example 1 will be described with reference to FIGS. 3 and 4. FIG. 3 is a sectional view of the counter substrate which is denoted by the reference numeral 57, taken along line B—B' of FIG. 4. FIG. 4 is a plan view of the pixel arrangement as is viewed from the side of the counter substrate of the transmission type liquid crystal display device of this example.

Referring to FIG. 3, a color filter layer 52 is formed on a transparent insulating substrate 51, and retardation layers 53 and 54 are arranged alternately on the color filter layer 52. The retardation layers 53 and 54 have a phase difference therebetween of a half wavelength, and the optic axes thereof are different from each other. On the retardation layers 53 and 54 is formed a polarizing layer 55 of which the polarizing axis is unified in a predetermined direction over the entire display screen. A transparent counter electrode 56 is then formed on the polarizing layer 55. An alignment film (not shown) is formed on the counter electrode 56 as required. Thus, the counter substrate 57 of the transmission type liquid crystal display device of Example 1 is obtained.

The counter substrate 57 and the active matrix substrate 49 of FIG. 2 are attached together so that the pixel electrodes 31 of the active matrix substrate 49 and the counter electrode 56 of the counter substrate 57 face each other, to complete a cell.

Referring to FIG. 4, the color filter layer 52 includes color filter strips of three primary colors, red (R), green (G), and blue (B), extending in the vertical direction. These color filter strips of three colors are arranged in order. The retardation layers 53 and 54 with the different optic axes are formed on the color filter layer 52 so that they are disposed alternately every row of pixels in the horizontal direction parallel to the gate lines 32. That is, each of the retardation layers 53 and 54 corresponds to a horizontal strip where pixels of three primary colors, R, G, and B, are lined repeatedly. Incidentally, every column of pixels in the vertical direction parallel to the source lines 33 includes pixels of the same color.

The direction of a polarizing axis 55a of the polarizing layer 55 is 45° from the vertical direction of the display screen, which is perpendicular to a polarizing axis 48a of the interlayer insulating film 48 serving as the polarizing layer of the active matrix substrate. An optic axis 53a of the retardation layer 53 is parallel to the polarizing axis 55a of the polarizing layer 55, while an optic axis 54a of the retardation layer 54 is in a direction rotated from the polarizing axis 55a by 45°, i.e., the horizontal direction of the display screen.

The active matrix substrate 49 and the counter substrate 57 with the above configurations are laminated together with an appropriate space therebetween. Twisted nematic (TN) liquid crystal material is injected in the space to complete a liquid crystal display panel of Example 1. The orientation of the liquid crystal molecules corresponding to each pixel is controlled with the electric field applied between the associated pixel electrode 31 and the counter electrode 56, so that a portion of the liquid crystal layer selectively modulates light incident thereon.

The transmission type liquid crystal display device with the above configuration is illuminated from the side of the active matrix substrate 49, and images are observed from the side of the counter substrate 57. Illumination light has various polarizations when it is incident on the active matrix substrate 49. Then, the illumination light enters the interlayer insulating film 48 formed on the inner surface of the active matrix substrate 49. Since the interlayer insulating film 48 serves as a polarizing layer as described above, only light having a polarization direction parallel to the polarizing axis 48a of the insulating film 48 passes through the insulating film 48.

Then, the linearly polarized light enters the liquid crystal layer, and the polarization direction thereof is selectively changed by the TN liquid crystal layer. As a result, the light going out from the liquid crystal layer has various polarization directions. The light exiting from the liquid crystal layer, which is referred to as the reference numeral 58 in FIG. 3, is then incident on the polarizing layer 55 of the counter substrate 57 to allow only light having a polarization direction parallel to the polarizing axis 55a of the polarizing layer 55 to pass therethrough, thus blocking light having the other polarization directions.

The light 58 which has passed through the polarizing layer 55 then passes through the retardation layers 53 and 54. At this time, the portion of the light incident on the retardation layer 53 of which optic axis 53a is parallel to the polarizing axis 55a of the polarizing layer 55 are allowed to pass through the retardation layer 53, preserving the polarization direction 55a. On the contrary, the other portion of the light incident on the retardation layer 54, of which optic axis 54a is rotated from the polarizing axis 55a by 45°, is forced to rotate its polarizing axis by 90° due to the phase difference corresponding to a half wavelength.

In the transmission type liquid crystal display device of this example, pixels are driven in a usual manner when a two-dimensional image display is performed. In the case of a three-dimensional image display, right-eye images and left-eye images are alternately displayed every row of pixels in the transmission type liquid crystal display device, and the observer needs to wear a pair of polarizing glasses including two polarizing plates of which polarizing axes are perpendicular to each other and respectively parallel to the polarizing axes of the above two types of light output from the liquid crystal display device. In this three-dimensional image display, two different types of signals for the right and left eyes may be input into the transmission type liquid crystal display device, and the corresponding type of signals is selected for each row of pixels to drive the gate lines and the source lines. Alternatively, images for the right and left eyes are previously synthesized into one type of signal, and the gate lines and the source lines are driven as in the two-dimensional image display.

The transmission type liquid crystal display device with the above configuration is fabricated as follows.

First, the fabrication process of the active matrix substrate 49 will be described.

The gate electrode 42, the gate insulating film 43, the semiconductor layer 44, the channel protection layer 45, and the n+Si layers which are to be the source electrode 46a and the drain electrode 46b are sequentially formed on the transparent insulating substrate 41 made of glass and the like by a known fabrication method of an active matrix substrate.

The transparent conductive films 47a and 47a' and the metal layers 47b and 47b' constituting the source line 33 and the connection line 35 are then sequentially formed by sputtering and patterned into predetermined shapes.

Then, the interlayer insulating film 48 is formed in the following manner. The interlayer insulating film 48 is formed of a polymer film mixed with a material providing a polarizing property to the polymer film. First, the polymer film such as polyvinyl alcohol (PVA) and the like and a material such as dichroic dye, iodine, iodide or the like are mixed. Then, the resultant polymer film is uniaxially drawn with a roller while being heated at an appropriate temperature, thereby both polymer molecules and molecules of the material contained in the polymer film are uniaxially aligned. Finally, the uniaxially drawn polymer film is pressed onto the active matrix substrate while being heated, to form the interlayer insulating layer 48 on the entire surface of the substrate 41 on which the gate line 32, the source lines 33, the TFTs 34 and the connection lines 35 are formed. The thickness of the interlayer insulating layer 48 is set to be in the range of 2–50 µm. In this example, a PVA film containing dichroic dye was used for forming the interlayer insulating film 48 with a thickness of 8 µm.

Next, the contact hole 36 is formed through the interlayer insulating film 48. First, a photosensitive resist with a desired pattern is applied to the interlayer insulating film 48. Then, the resist is exposed to light and developed, and etched by dry etching or with a heated alkalic aqueous solution. Thus, the contact hole 36 is obtained.

The transparent conductive film is formed on the resultant substrate by sputtering and is then patterned to form the pixel electrodes 31 arranged in a matrix. Each pixel electrode 31 is connected to the transparent conductive film 47a' which, in turn, is connected to the drain electrode 46b of the TFT 34 via the contact hole 36 formed through the interlayer insulating film 48. Thus, the active matrix substrate 49 in Example 1 is fabricated.

The fabrication process of the counter substrate 57 will now be described.

The color filter layer 52 composed of color filter strips of three primary colors, R, G, and B, is formed using an acrylic polymer and a photosensitive resin by photolithography on the transparent insulating substrate 51 made of glass or the like. Then, a liquid crystal polymerizable material is placed onto the resultant substrate to a predetermined thickness, and with two masks, each having an opening corresponding to every other row of pixels, placed thereon, the liquid crystal polymerizable material is irradiated with ultraviolet (UV) light which is linearly polarized so as to be polymerized. In this way, the retardation layers 53 and 54, having a phase difference of a half wavelength therebetween, are obtained. The optic axes of the retardation layers 53 and 54 are parallel to the polarizing axis of the light radiated to the liquid crystal polymerizable material. In this example, the directions of the optic axes of the retardation layers 53 and 54 are set as described above.

The polarizing layer 55 having a predetermined polarizing axis is then formed on the retardation layers 53 and 54 in a manner similar to that used for the formation of the interlayer insulating film 48 as the polarizing layer of the active matrix substrate 49. The transparent counter electrode 56 is then formed on the polarizing layer 55.

Alternatively, the retardation layers 53 and 54 may be formed in the following manner. An alignment film made of polyimide or the like is formed, patterned and processed so that two predetermined alignment directions are alternately formed in every horizontal strip of the film corresponding to each row of pixels. Then, a liquid crystal polymerizable material is applied on the film and heated or irradiated with light to form the retardation layers having optic axes corresponding to the directions of the alignment film.

In the transmission type liquid crystal display device obtained by laminating the thus-fabricated active matrix substrate 49 and counter substrate 57, it is possible to overlap the pixel electrode 31 on the gate lines 32 and source lines 33 and TFT 34 by the existence of the interposing interlayer insulating film 48 which is a thick polarizing layer. By flattening the surface of the interlayer insulating film 48, the aperture ratio of the resultant liquid crystal device can be improved. Moreover, an occurrence of disclination can be suppressed by shielding an electric field generated in the lines 32 and 33 by the pixel electrode 31.

The thick interlayer insulating film 48 formed between the pixel electrode 31 and the lines 32 and 33 serves as the polarizing plate indispensable for the configuration of the transparent liquid crystal display device. This reduces the number of steps, as well as the number of components, in consideration of the entire fabrication process of the transmission type liquid crystal display device.

In this example, the polarizing layers are formed inside the liquid crystal panel. This reduces an occurrence of crosstalk of right-eye and left-eye images due to parallax as described above. In this example, also, the interlayer insulating film 48 as the polarizing layer on the active matrix substrate 49 can be formed after the formation of the gate insulating film 43 which requires a comparatively high temperature. This prevents the conventional problem of losing the polarizing capability of the polarizing layer under high temperatures, and thus the success rate of the fabrication of the transmission type liquid crystal display device significantly increases.

EXAMPLE 2

In a transmission type liquid crystal display device of Example 2, light enters a liquid crystal layer, acting as a display medium, from the side of the counter substrate, and then exits from the side of the active matrix substrate which have retardation layers for providing a phase difference to the light passing therethrough. Thus, two types of light having different polarizations corresponding to right-eye and left-eye pixels go out from the active matrix substrate.

In this example, although polarizing layers are formed on both the counter substrate and the active matrix substrate, one of the polarizing layers, which is disposed on the counter substrate, is arranged on the outer surface thereof. In addition, the structure of the active matrix substrate is also different from that of Example 1, in particular, the structure covering the TFT 34, the lines 32 and 33, and the connection line 35 to separate them from the pixel electrode 31. The plan view of the display portion of the liquid crystal display device of Example 2 as is viewed from the side of the counter substrate having the color filter layer 52 is substantially the same in appearance as that of Example 1 shown in FIG. 4.

The configuration of the active matrix substrate in this example will be described.

Figure 5:
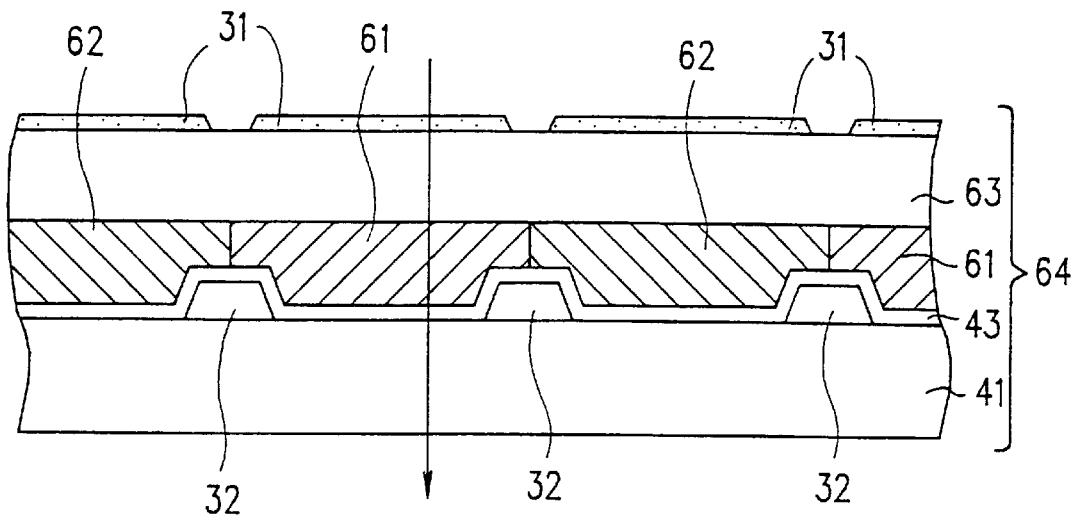
FIG. 5 is a sectional view of an active matrix substrate of a transmission type liquid crystal display device of Example 2 according to the present invention.

FIG. 5 is a sectional view of an active matrix substrate 64 in Example 2 taken along line B—B' of FIG. 4. The TFTs 34, the source lines 33, the connection lines 35, and the contact holes 36 are formed on the transparent insulating substrate 41 as in Example 1, though they are not shown in FIG. 5 because they do not appear in the section taken along line B—B'.

Referring to FIG. 5, thick retardation layers 61 and 62 are formed covering the TFTs 34, the gate lines 32, the source lines 33, and the connection lines 35, in place of the interlayer insulating layer 48 as the polarizing layer in Example 1. The retardation layers 61 and 62 have a phase difference of a half wavelength therebetween and optic axes which are different from each other. Such retardation layers 61 and 62 are formed alternately every row of pixels in the horizontal direction. A polarizing layer 63 having a unified polarizing axis over the entire display screen is formed on the retardation layers 61 and 62.

More specifically, the gate lines 32 and the gate insulating film 43 are formed on the transparent insulating substrate 41, such as a glass substrate or the like. The retardation layers 61 and 62 are then formed on the substrate 41, and the polarizing layer 63 is formed on the phase retardation layers 61 and 62. A transparent conductive film, which is patterned to form the pixel electrodes 31, is formed on the polarizing layer 63.

The retardation layers 61 and 62 and the polarizing layer 63 may be formed by the same technique as that used in the fabrication of the active matrix substrate 49 and the counter substrate 57 in Example 1. After the formation of the phase difference layers 61 and 62 and the polarizing layer 63, the contact holes 36 are formed through the retardation layers 61 and 62 and the polarizing layer 63 to electrically connect the pixel electrodes 31 to the corresponding connection lines 35, thus completing the active matrix substrate 64 in Example 2.

Figure 6:
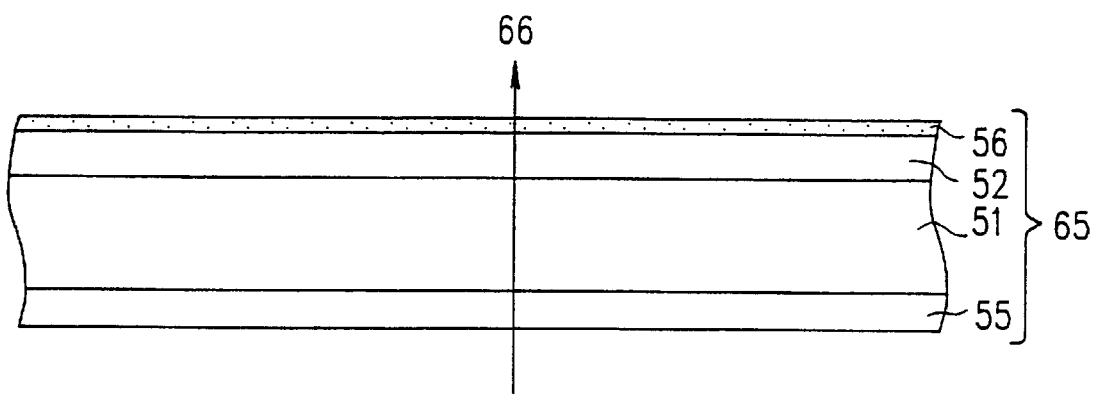
FIG. 6 is a sectional view of a counter substrate of the transmission type liquid crystal display device of Example 2.

The configuration of the counter substrate in this example will now be described. FIG. 6 is a sectional view of a counter substrate 65 of Example 2, taken along line B—B' of FIG. 4.

Referring to FIG. 6, the color filter layer 52 and the counter electrode 56 are formed in this order on one of the surfaces of the transparent insulating substrate 51 such as a glass substrate or the like. The polarizing layer 55, having a unified polarizing axis over the entire display screen, is formed on the other surface of the transparent insulating substrate 51, thus completing the counter substrate 65 in Example 2. The counter substrate 65 thus fabricated is attached to the active matrix substrate 64 with appropriate space therebetween so that the counter electrode 56 and the pixel electrodes 31 face each other. Therefore, the polarizing layer 55 is located on the outer surface of the counter substrate 65 when the active matrix substrate 64 and the counter substrate 65 oppose one another. In the space between the substrates 64 and 65, a liquid crystal material is injected to form a liquid crystal display device.

The transmission type liquid crystal display in Example 2 is illuminated from the side of the counter substrate 65, and the observer views an image displayed by the liquid crystal display from the side of the active matrix substrate 64. When light 66 is emitted from an illuminator (not shown), the illumination light 66 having various polarization directions is incident on the polarizing layer 55 formed on the counter substrate 65, thereby allowing only linearly polarized light having a polarization direction parallel to the optic axis of the polarizing layer 55 to pass therethrough. Then, the linearly polarized light 66 passes through the insulating substrate 51, the color filter layer 52 and the counter electrode 56, as shown in FIG. 6, and enters the liquid crystal layer (not shown).

The liquid crystal layer selectively changes the polarization direction of the linearly polarized light 66 incident thereon in accordance with an electric field applied across the liquid crystal layer. After passing the liquid crystal layer, the light 66 is incident on the active matrix substrate 64 from the side of the pixel electrodes 31, and travels across the substrate 64 in a direction indicated by an arrow in FIG. 5.

When passing through the phase difference layers 61 and 62, the polarizing direction of the light 66 is selectively changed. More specifically, the polarizing direction of the portion of the light 66, which is incident on the phase difference layers 61, is rotated by 90° because polarization direction of the light 66 is shifted from the optic axis of the phase difference layer 61 by 45°. On the contrary, the polarization direction of the other portion of the light 66, which is incident on the phase difference layers 62, passes through the phase difference layers 62 without any change in polarization direction, because the polarization direction of the light 66 is perpendicular to the optic axis of the phase difference layers 62.

With the above configuration, as in Example 1, while two-dimensional images can be observed by the naked eye, three-dimensional images can be observed by the observer who wears a pair of polarizing glasses having two polarizing axes corresponding to the polarizing axes of the light output from the transmission type liquid crystal display device.

Thus, in this example, the phase difference layers 61 and 62 and the polarizing layer 63 are formed on the inner surface of the active matrix substrate 64 in place of the interlayer insulating film. This combination of the phase difference layers 61 and 62 and the polarizing layer 63 constitutes a structure composed of a plurality of small regions, each having the polarizing property and the retardation function, corresponding to at least one pixel. The directions of the polarizing axes of one such small region and an adjacent small region are different from each other. With this configuration, three-dimensional images can be displayed without an occurrence of crosstalk. Also, it is possible to use the active matrix substrate as the display screen to be viewed by the observer, while light is incident on the counter substrate. Accordingly, the transmission type liquid crystal display device of this example can be used for projectors and the like since wrong operation of TFTs due to strong illumination light can be avoided, and thus the range of applicable fields for the device is widened.

The optic axes of the phase difference layers 61 and 62 and the polarizing axes of the polarizing layers 63 and 55 correspond to the optic axes 53a and 54a and the polarizing axes 48a and 55a shown in FIG. 4, respectively.

In Example 2, the polarizing layer 55 was disposed on the outer surface of the counter substrate 65. Alternatively, it may be disposed between the color filter layer 52 and the counter electrode 56 of the counter substrate 65.

In Example 2, two types of linearly polarized light having the polarizing axes perpendicular to each other were used to realize two types of polarizations for the right-eye and left-eye images for stereoscopic display. Alternatively, circularly polarized light may be used. In this case, the optic axes of the phase difference layers and the phase difference between the phase difference layers are appropriately changed.

Figure 7:
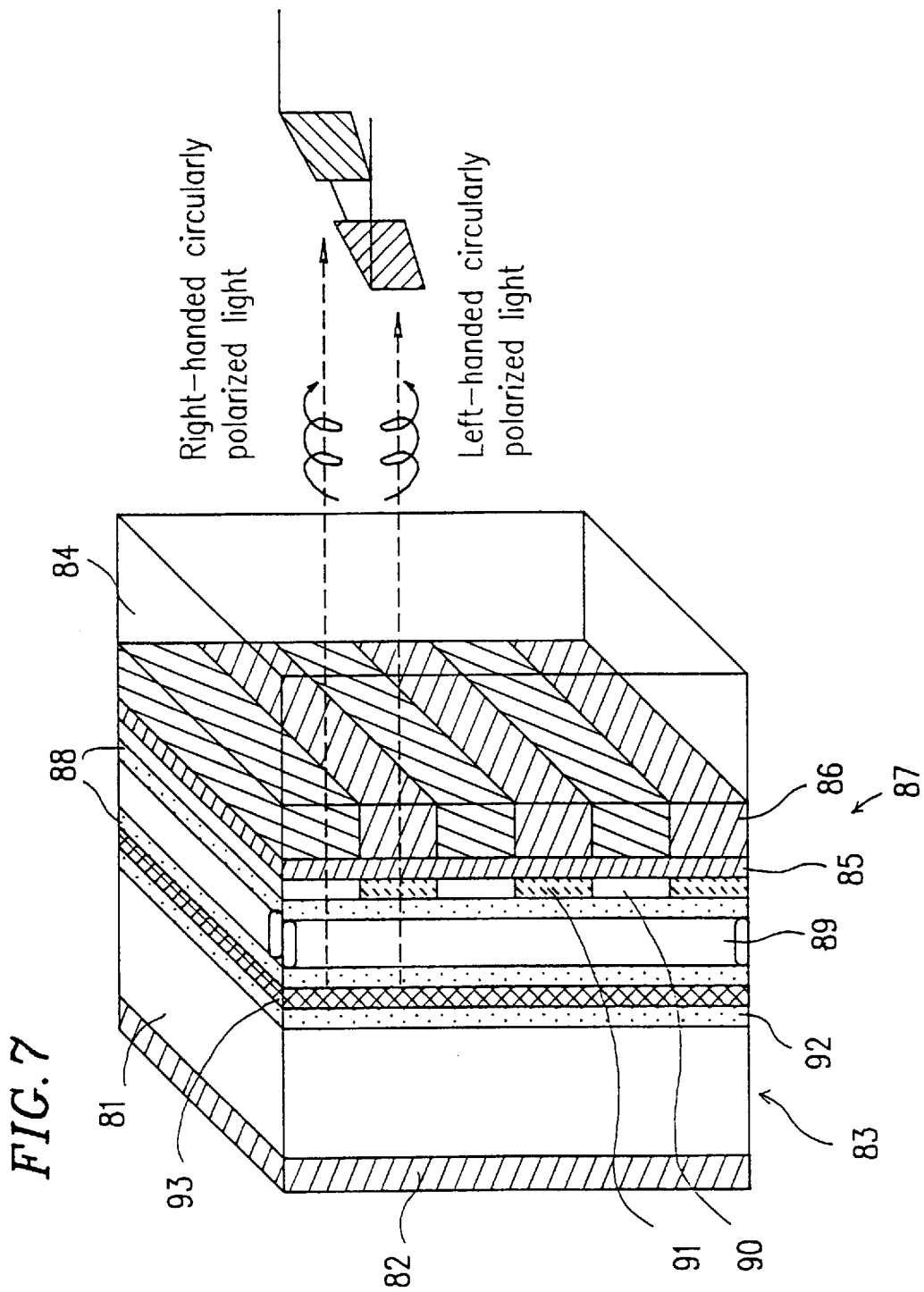
FIG. 7 is a conceptual view of a three-dimensional image display obtained when circularly polarized light is used.

For example, as shown in FIG. 7, light may be incident on a counter substrate 83 with a polarizing layer 82 formed on the outer surface of a glass substrate 81, and output from an active matrix substrate 87 having a polarizing layer 85 and a phase difference layer 86 composed of two types of regions formed on the inner surface of a glass substrate 84. The counter substrate 83 also includes a color filter layer 92 and a counter electrode 93. The active matrix substrate 87 also includes right-eye and left-eye pixel electrodes 90 and 91. The counter substrate 83 and the active matrix substrate 87 are laminated together with a liquid crystal layer 89 therebetween with alignment films 88 formed on the inner surfaces of the substrates. The polarizing axis of one type of regions of the phase difference layer 86 is inclined by 45° with respect to the light propagation direction, while that of the other type of regions of the phase difference layer 86 is inclined by 45° reversely with respect to the light propagation direction. The two types of regions of the phase difference layer 86 have therefore optic axes perpendicular to each other, and the phase difference between the two types of regions is adjusted to be a ¼ wavelength.

As a result, linearly polarized light which has passed through the polarizing layer 85 of the active matrix substrate 87 on the light output side is converted into two types of circularly polarized light having different rotational directions by the two types of regions of the phase difference layer 86. For example, right-handed circularly polarized light is output from the regions of the phase difference layer for the right eye corresponding to the right-eye pixel electrodes 90, while left-handed circularly polarized light is output from the regions of the phase difference layer for the left eye corresponding to the left-eye pixel electrodes 91. Through a pair of polarizing glasses having circularly-polarizing plates corresponding to the respective polarizing states, the right and left eyes of the observer only receive images for the right and left eyes, respectively. This is maintained even when the head of the observer is moved upward and downward or put to one side. An occurrence of crosstalk of doubling images is therefore prevented, and thus a three-dimensional image display with good quality can be obtained.

EXAMPLE 3

In a transmission type liquid crystal display device of Example 3, no phase difference layer is formed, and a polarizing layer is formed upon both an active matrix substrate and a counter substrate.

Figure 8:
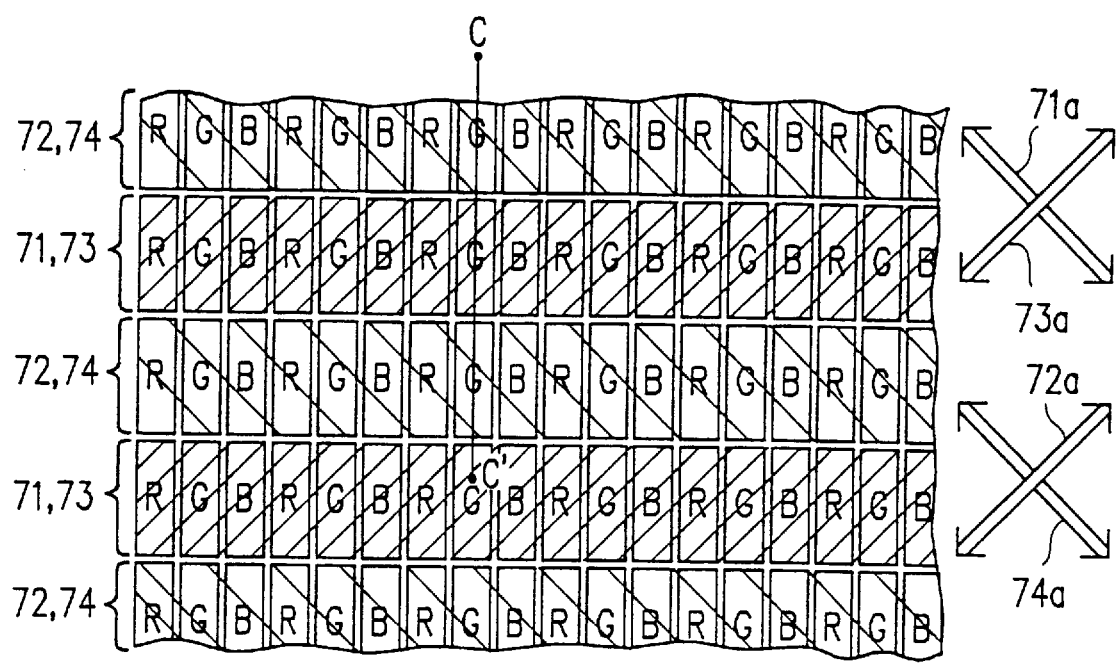
FIG. 8 is a plan view of the pixel structure of a transmission type liquid crystal display device of Example 3 according to the present invention.

FIG. 8 is a plan view of the pixel arrangement as is viewed from the side of the counter substrate of the transmission type liquid crystal display device of this example.

Referring to FIG. 8, as in Examples 1 and 2, a color filter layer is composed of R, G, and B color strips extending in the vertical direction (a direction parallel to the column of the pixels). Polarizing portions 71 and 72 are formed on one surface of the active matrix substrate, while polarizing portions 73 and 74 are formed on one surface of the counter substrate. The polarizing portions 71 and 72 of the active matrix substrate are alternately formed every row of pixels and have polarizing axes 71a and 72a perpendicular to each other. Likewise, the polarizing portions 73 and 74 of the counter substrate are alternately formed every row of pixels and have polarizing axes 73a and 74a perpendicular to each other. The polarizing portions 71 and 73 optically overlap each other, and the polarizing axes 71a and 73a are perpendicular to each other. The polarizing portions 72 and 74 optically overlap each other, and the polarizing axes 72a and 74a are perpendicular to each other.

Figure 9:
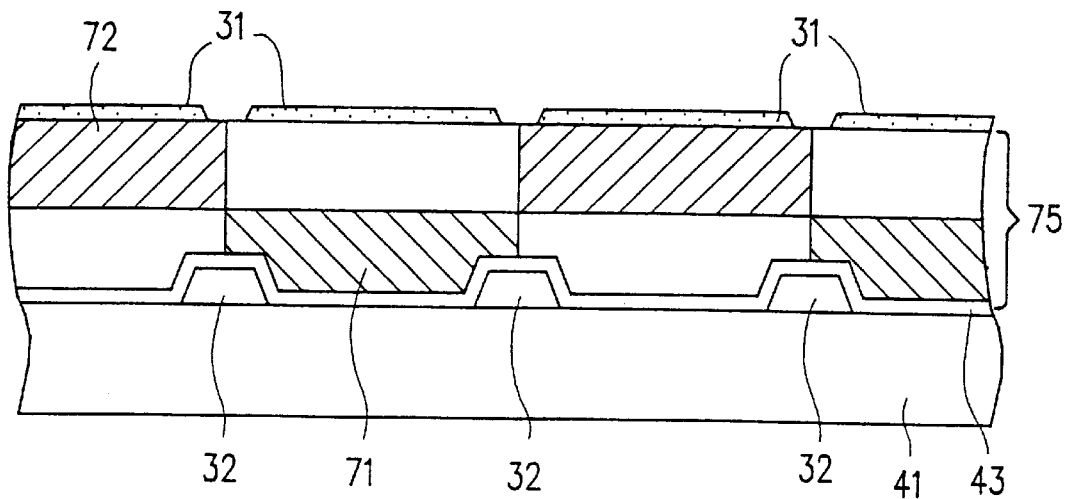
FIG. 9 is a sectional view of an active matrix substrate of the transmission type liquid crystal display device of Example 3, taken along line C—C' of FIG. 8.

FIG. 9 is a sectional view of the active matrix substrate, taken along line C—C' of FIG. 8. The TFTs 34, the source lines 33, the connection lines 35, and the contact holes 36 are formed on the transparent insulating substrate 41 as in Example 1, though they are not shown in FIG. 9 because they do not appear in the section taken along line C—C'.

Referring to FIG. 9, the gate lines 32 and the gate insulating film 43 are formed on the transparent insulating substrate 41. A polarizing layer 75 is formed on the resultant substrate to serve as a thick layer for providing a space separating the lines 32 and 33 and the TFTs 24 from the pixel electrodes 31. The polarizing layer 75 is of a double-layer structure composed of a lower layer and an upper layer. The lower layer includes the polarizing portions 71 having the polarizing axis 71a and portions with no polarizing capability formed alternately every row of pixels. The upper layer includes the polarizing portions 72 having the polarizing axis 72a and portions with no polarizing capability formed alternately every row of pixels. The polarizing axes 71a and 72a are perpendicular to each other. The polarizing portions 71 are overlapped by the portions with no polarizing capability of the upper layer, while the polarizing portions 72 overlap the portions with no polarizing capability of the lower layer.

The polarizing layer 75 is formed in the manner described in Example 1. That is, a polymer film, such as PVA, containing a material for providing a polarizing property to the polymer film, for example, a dichroic dye, iodine, iodide, or the like, is used for forming the lower layer of the polarizing layer 75. First, the polymer film with the material mixed therein is uniaxially drawn with a roller or the like while being heated to an appropriate temperature. During this time, the material for providing the polarizing property is selectively mixed so as to obtain portions containing the material and portions without the material. Then, the drawn polymer film is pressed onto the gate insulating film 43 while being heated. Thus, the lower layer of the polarizing layer 75 is formed. The upper layer of the polarizing layer 75 is then formed in the same manner. The contact holes 36 are formed through the polarizing layer 75, and then the pixel electrodes 31 are formed.

Figure 10:
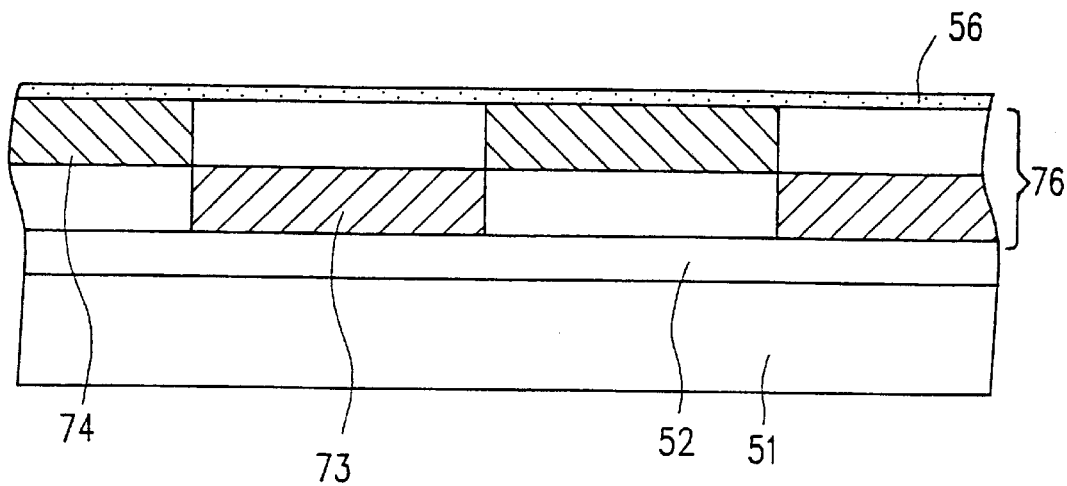
FIG. 10 is a sectional view of a counter substrate of the transmission type liquid crystal display device of Example 3, taken along line C—C' of FIG. 8.

FIG. 10 is a sectional view of the counter substrate, taken along line C—C' of FIG. 8.

Referring to FIG. 10, the color filter layer 52, a polarizing layer 76 including the polarizing portions 73 and 74 having the different polarizing axes, and the transparent counter electrode 56 are formed in this order on the transparent insulating substrate 51. The polarizing layer 76 can be formed in the same manner as that used in the formation of the polarizing layer 75 of the active matrix substrate described above.

The above active matrix substrate and counter substrate are laminated together to form the transmission type liquid crystal display device of Example 3. With this configuration, when incident illumination light passes through the liquid crystal device, two types of light of which polarizing axes are perpendicular to each other are output therefrom every row of pixels to effect an image display. Accordingly, two-dimensional images can be displayed from either side of the active matrix substrate and the counter substrate. Three-dimensional images can be observed from either side by using a corresponding pair of polarizing glasses. This widens the range of applicable fields for the transmission type liquid crystal display device.

The polarizing layers 75 and 76 may also be fabricated as a single-layer structure by forming two types of regions alternately in one photocurable polymer layer by an optical alignment technique as used in the formation of the phase difference layers composed of two types of regions in Examples 1 and 2.

The thickness of such phase difference layers is one of the important elements in the decision of the phase difference. The thickness is therefore preferably uniform. In order to flatten the unevenness formed by the source lines, the gate lines, the switching elements, and the like, a transparent acrylic resin may be applied to the surface of the resultant substrate with a spinner and cured by heating before the formation of an alignment layer and the phase difference layer. Any resin can be used for the resin layer as long as it has high transparency and high thermal resistance. A resin which can be cured with UV light may also be used.

Since no phase difference layer is necessary in Example 3 and the control of the thickness of the polarizing layer is less strict, the fabrication is more easy.

Each contact hole may be formed in a light-shading portion for shading a $C_s$ line for a storage capacitance for the pixel electrode so that light leakage and the like due to failure in the alignment of liquid crystal caused by the unevenness at the contact hole can be concealed by the light-shading portion. In order to enhance the adhesion between the pixel electrode and the line contact portion, a titanium nitride layer or the like may be previously formed and patterned before the formation of the phase difference layer and the polarizing layer.

Figure 11:
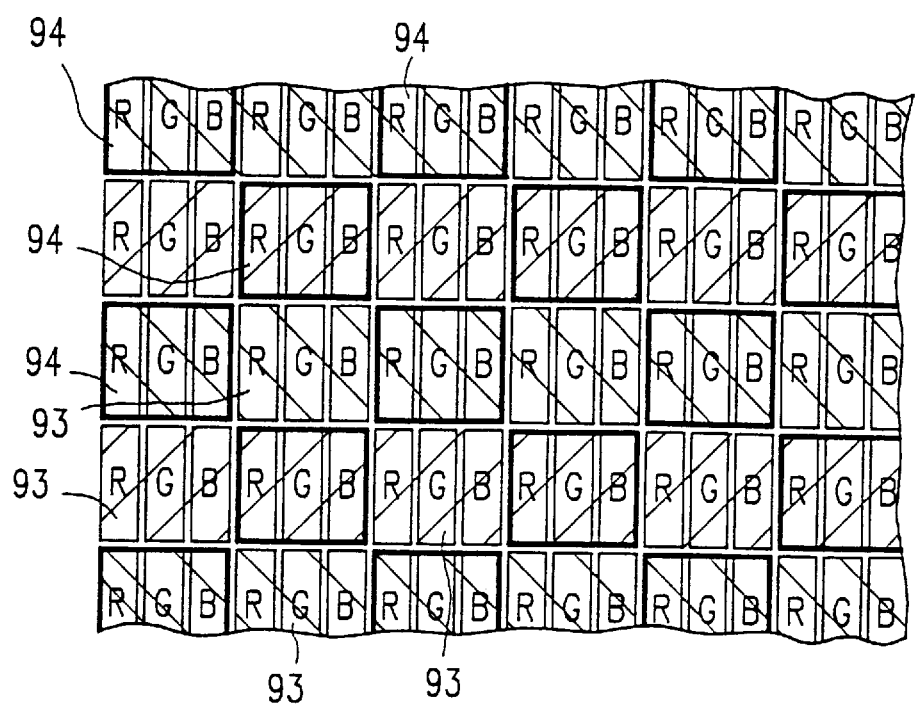
FIG. 11 is a plan view of the pixel structure of an alternative transmission type liquid crystal display device according to the present invention, where right-eye and left-eye pixels are arranged in a mosaic fashion.
Figure 12:
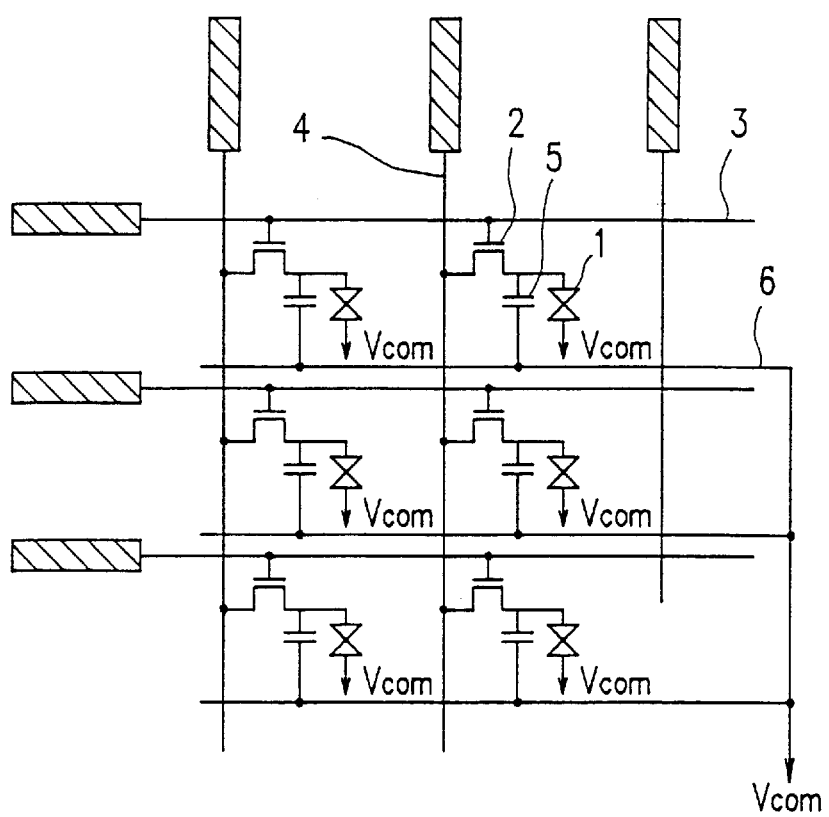
FIG. 12 is a circuit diagram of a conventional liquid crystal display device having an active matrix substrate.
Figure 13:
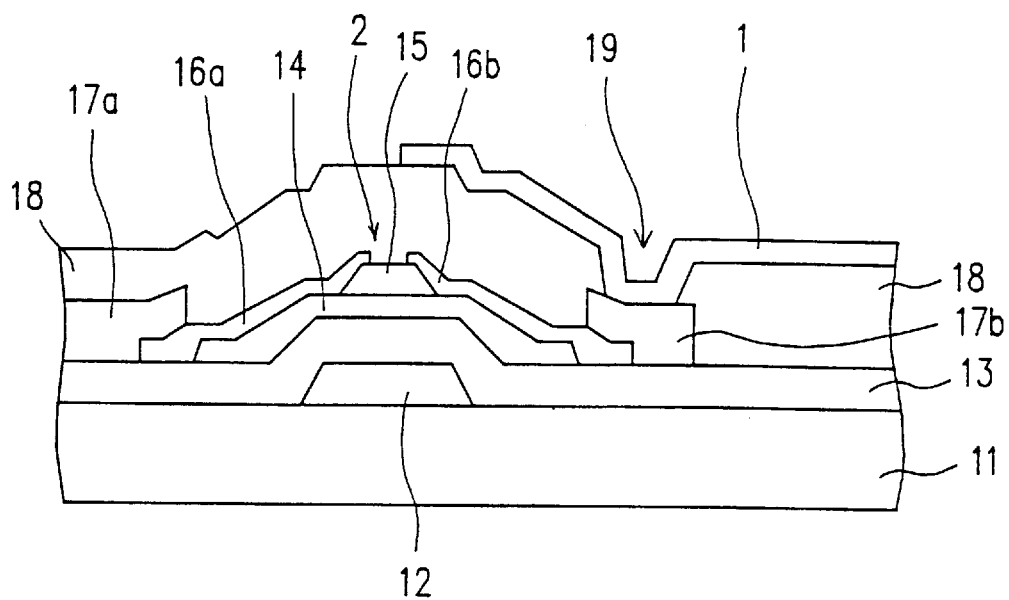
FIG. 13 is a sectional view of one TFT of the active matrix substrate of the conventional liquid crystal display device.
Figure 14:
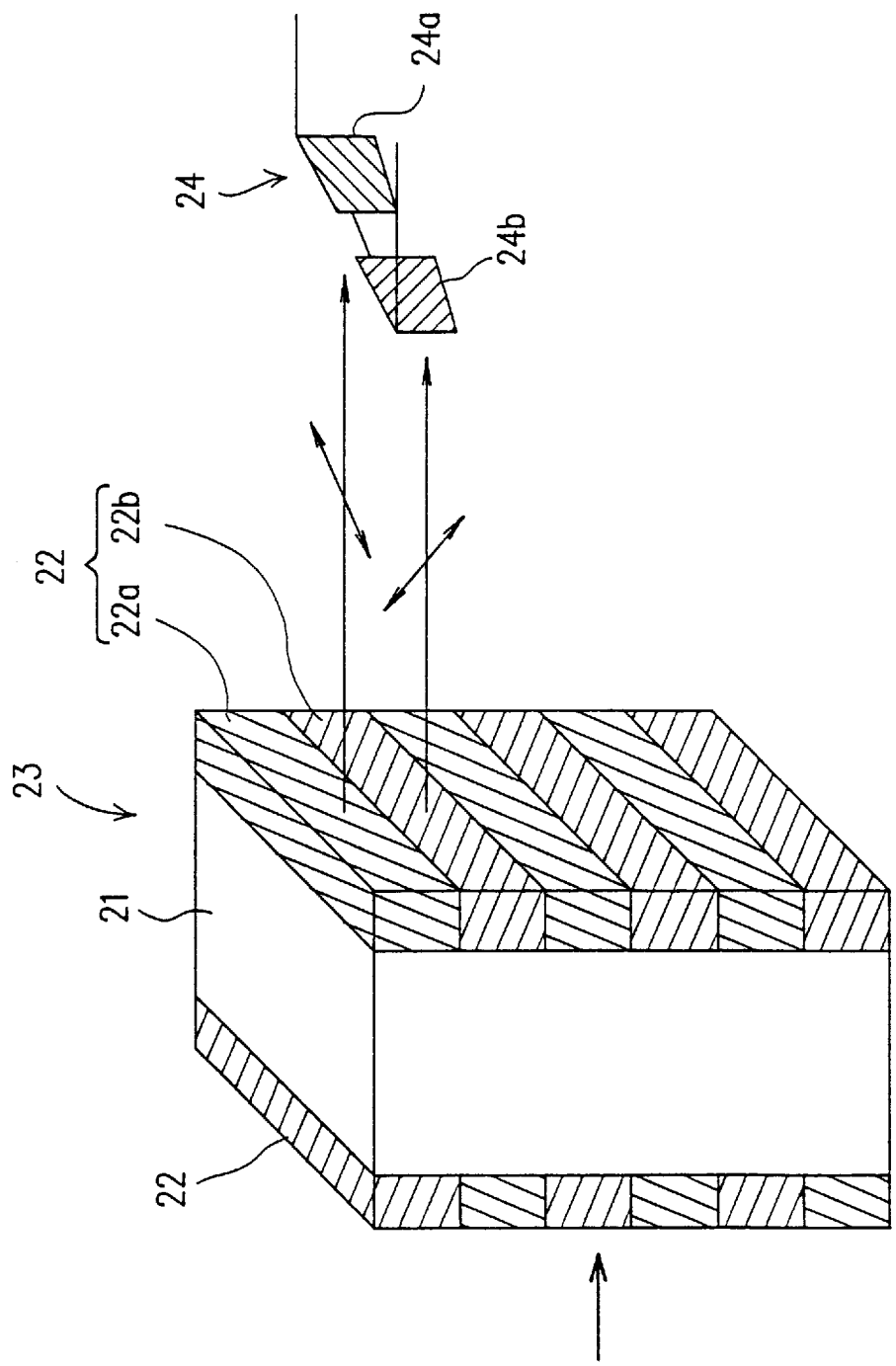
FIG. 14 is a conceptual view of conventional three-dimensional image display using a pair of polarizing glasses.
Figure 15:
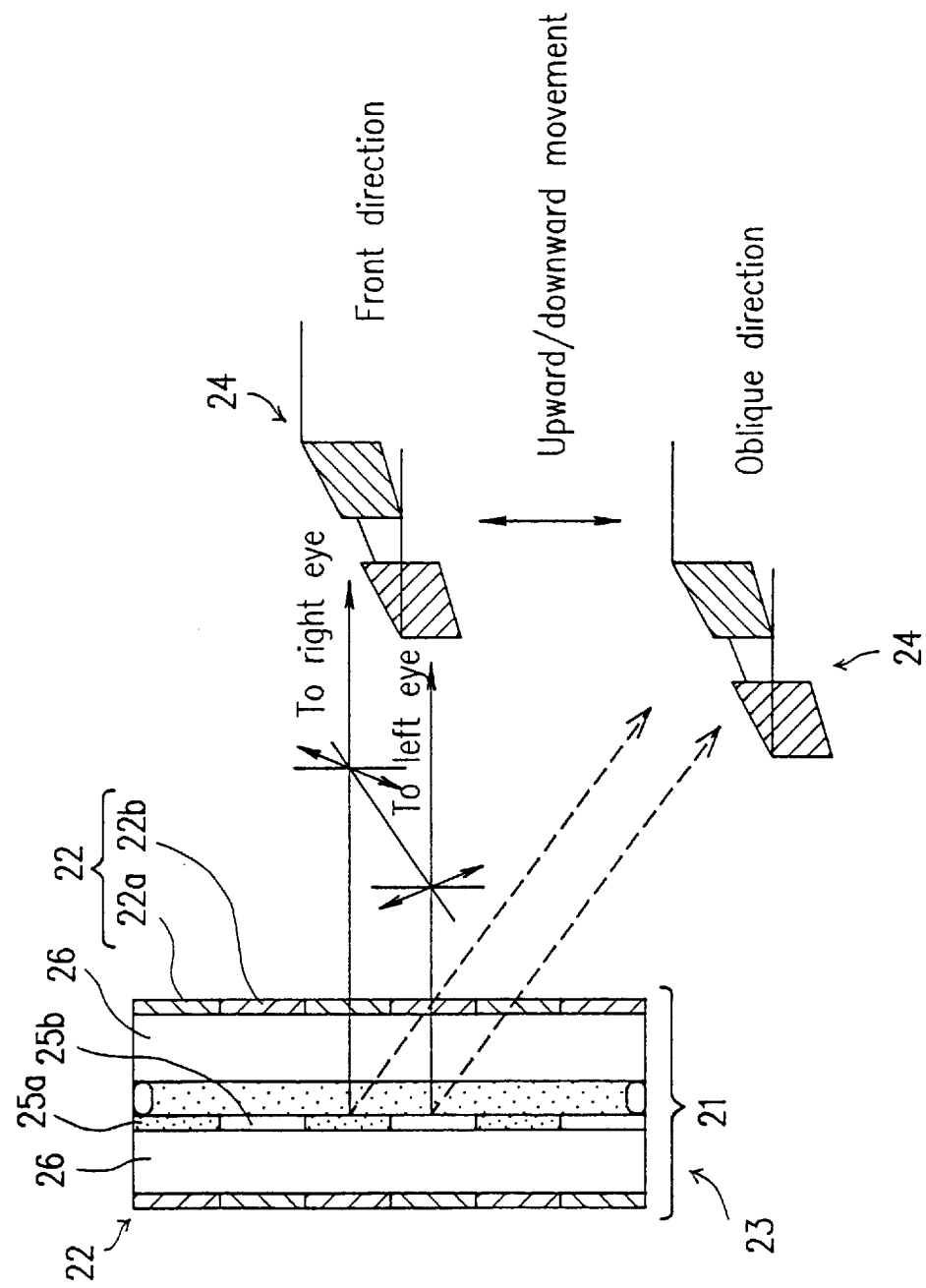
FIG. 15 is a conceptual view showing an occurrence of crosstalk.

In Examples 1 to 3, the polarizing portions are alternately formed every row of pixels as strips. Alternatively, the polarizing portions may be alternately formed every column of pixels as strips. Otherwise, the polarizing portions may be alternately formed every pixel which is composed of three picture elements in a mosaic fashion, as shown in FIG. 11. The polarizing portions may also be alternately formed every some rows or columns of pixels or every some pixels.

FIG. 11 is a plan view of the pixel structure of a transmission type liquid crystal display device where right-eye and left-eye images are alternately displayed every pixel in the horizontal and vertical directions in a mosaic fashion.

Referring to FIG. 11, pixels 93 and 94, each composed of R, G, and B three picture elements, are arranged in a mosaic fashion for right-eye and left-eye image displays, respectively. Two different circularly-polarizing states can be obtained by forming polarizing layers and phase difference layers such as those described in Examples 1 and 2 in a pattern corresponding to the above pixel structure. Alternatively, two different polarizing states can be obtained by disposing polarizing portions, of which the polarizing axes are perpendicular to each other, as those described in Example 3 in a pattern corresponding to the above pixel structure. With this configuration, a three-dimensional image display can be realized through a pair of polarizing glasses.

Thus, according to the present invention, the interlayer insulating film is formed on the TFTs, the scanning lines, and the signal lines, and the pixel electrodes are formed on the interlayer insulating film. The pixel electrodes are connected to the drain electrodes of the TFTs via the connection lines and through the contact holes formed through the interlayer insulating film. By forming the interlayer insulating film, it is possible to overlap the pixel electrodes on these lines, thereby improving the aperture ratio. Also, failure in the alignment of liquid crystal can be suppressed. The interlayer insulating film which is made of an organic material has a low dielectric constant and high quality and can be formed with good productivity, compared with the conventional film made of an inorganic material such as silicon nitride. This makes it possible to increase the thickness of the film. A thick interlayer insulating film reduces capacitances between the lines and the pixel electrodes, lowering the signal transmission rate. This further reduces the adverse effect, such as crosstalk, of the capacitances between the lines and the pixel electrodes on the display, thereby providing a good display. Moreover, the interlayer insulating film is provided with the polarizing property. This eliminates crosstalk at the three-dimensional image display, provides images with a wide angle of visibility, and thus improves the display quality. The provision of the polarizing property to the interlayer insulating film also shortens the fabrication process and reduces production costs, compared with the case of separately forming a polarizing layer.

The interlayer insulating film is composed of a plurality of regions each having the polarizing property corresponding to at least one pixel. The polarizing axis of one region having the polarizing property and that of an adjacent region are made to be different from each other. With this arrangement, the active matrix substrate can be located either on the observer's side or on the side of the light source. This allows the use of the transmission type liquid crystal display device as a projector and the like and thus widens the range of available fields for the liquid crystal display device.

The interlayer insulating film may be composed of the phase difference layer having the retardation function and the polarizing layer having the polarizing property. With this configuration, circularly polarized light can be output from the liquid crystal display device. Therefore, no crosstalk occurs even when the observer wearing the pair of polarizing glasses puts his or her head to one side. This further improves the display quality of three-dimensional images.

When a three-dimensional display of images such as characters is conducted, only the observer wearing the pair of polarizing glasses can recognize the displayed images, while other observers who do not wear the pair of polarizing glasses only observe dim doubled images which are not discernable. This means that the transmission type liquid crystal display device according to the present invention can provide good secrecy because only the observer who wears the pair of polarizing glasses can recognize images displayed on the screen.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transmission type liquid crystal display device including a plurality of pixels for displaying an image, comprising:

a first substrate and a second substrate opposed to each other;

a liquid crystal layer interposed between the first and the second substrates;

a plurality of electrodes for driving the pixels in accordance with data signals, the electrodes including a plurality of pixel electrodes formed on the first substrate and at least one counter electrode formed on the second substrate;

switching elements, connected to the plurality of pixel electrodes through contact holes, for supplying the data signals, the switching elements being disposed on the first substrate;

scanning lines, formed on the first substrate, for transmitting signals which activate the switching elements;

signal lines, formed on the first substrate to cross the scanning lines, for transmitting the data signals to the switching elements;

an interlayer insulating film formed on the first substrate between the switching elements and the pixel electrodes, wherein the contact holes extend through the interlayer insulating film, and the interlayer insulating film having at least a polarizing property; and a further layer having a polarizing property formed on the second substrate, wherein at least one of the interlayer insulating film and the further layer is formed inside of the first substrate and the second substrate when the first substrate and the second substrate are attached to each other.

2. A transmission type liquid crystal display device according to claim 1, wherein the pixels include groups of right-eye pixels and groups of left-eye pixels;

wherein at least one of the interlayer insulating film and the further layer includes first portions allowing polarized light having a first polarization to pass therethrough and second portions allowing polarized light having a second polarization to pass therethrough; and wherein the first portions and the second portions are arranged to correspond to the groups of right-eye pixels and the groups of left-eye pixels, respectively.

3. A transmission type liquid crystal display device according to claim 2, further comprising a retardation layer formed on the second substrate, wherein the retardation layer, the further layer and the counter electrode are disposed on the side of the second substrate which is adjacent to the liquid crystal layer.

4. A transmission type liquid crystal display device according to claim 2, wherein the interlayer insulating film has a retardation property.

5. A transmission type liquid crystal display device according to claim 1, wherein the pixel electrodes overlap at least partially at least one of the scanning lines and the signal lines.

6. A transmission type liquid crystal display device according to claim 2, wherein each of the groups of right-eye pixels and the groups of left-eye pixels includes a row of the pixels.

7. A transmission type liquid crystal display device according to claim 6, further comprising a color filter layer formed on the second substrate, wherein the color filter layer includes a plurality of strips of three colors, and each of the strips corresponds to a column of the pixels.

8. A transmission type liquid crystal display device including a plurality of pixels for displaying an image, comprising;

a first substrate and a second substrate opposed to each other;

a liquid crystal layer interposed between the first and the second substrates;

a plurality of electrodes for driving the pixels in accordance with data signals, the electrodes including a plurality of pixel electrodes formed on the first substrate and at least one counter electrode formed on the second substrate;

switching elements, connected to the plurality of pixel electrodes, for supplying the data signals, the switching elements being disposed on the first substrate;

scanning lines, formed on the first substrate, for transmitting signals which actuate the switching elements;

signal lines, formed on the first substrate to cross the scanning lines, for transmitting the data signals to the switching elements;

an interlayer insulating film formed on the first substrate to cover the switching elements, the scanning lines and the signal lines, the interlayer insulating film having at least a polarizing property;

a further layer having a polarizing property formed on the second substrate;

wherein at least one of the interlayer insulating film and the further layer is formed inside of the first substrate and the second substrate when the first substrate and the second substrate are attached to each others, and wherein each of the interlayer insulating film and the further layer includes a double-layer structure composed of a lower layer and an upper layer.

9. A transmission type liquid crystal display device according to claim 8, wherein each of the lower layers and the upper layers has polarizing portions having a polarizing property and non-polarizing portions without the polarizing property, the upper layer being disposed on the lower layer so that the polarizing portions of the upper layer are located on the non-polarizing portions of the lower layer and the non-polarizing portions of the upper layer are located on the polarizing portions of the lower layer.

10. A transmission type liquid crystal display device including a plurality of pixels for displaying an image, comprising;

a first substrate and a second substrate opposed to each other;

a liquid crystal layer interposed between the first and the second substrates;

a plurality of electrodes for driving the pixels in accordance with data signals, the electrodes including a plurality of pixel electrodes formed on the first substrate and at least one counter electrode formed on the second substrate;

switching elements, connected to the plurality of pixel electrodes, for supplying the data signals, the switching elements being disposed on the first substrate;

scanning lines, formed on the first substrate for transmitting signals which actuate the switching elements;

signal lines, formed on the first substrate to cross the scanning lines, for transmitting the data signals to the switching elements;

an interlayer insulating film formed on the first substrate to cover the switching elements, the scanning lines and the signal lines, the interlayer insulating film having at least a polarizing property;

a further layer having a polarizing property formed on the second substrate;

wherein at least one of the interlayer insulating film and the further layer is formed inside of the first substrate and the second substrate when the first substrate and the second substrate are attached to each other, and further comprising connection lines for connecting the pixel electrodes to the respective switching elements, the connection lines being covered by the interlayer insulating film, wherein the interlayer insulating film has contact holes through which the pixel electrodes are connected to the respective connection lines.

* * * * *